May 6, 1930.  L. E. LA BRIE  1,756,982
BRAKE
Filed Nov. 29, 1926
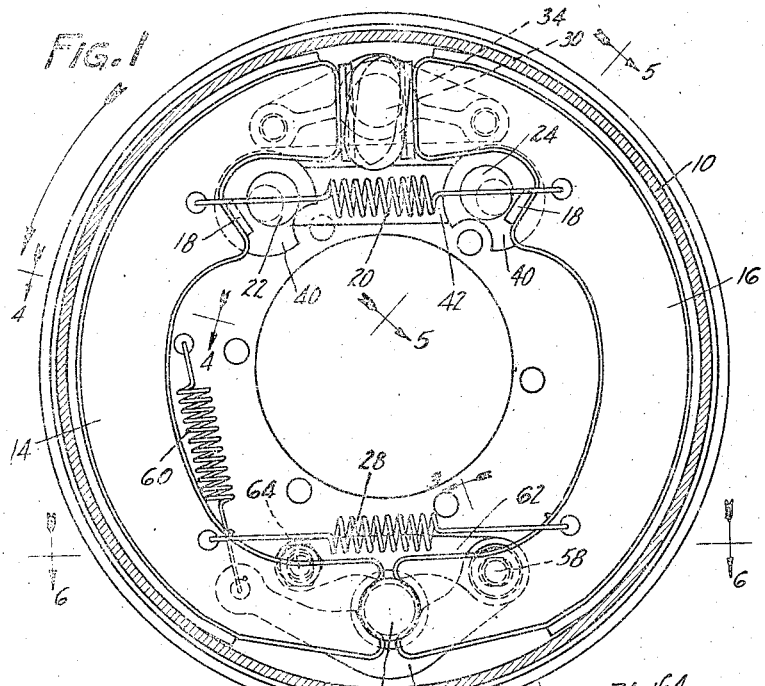
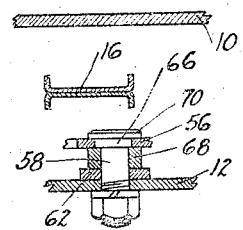
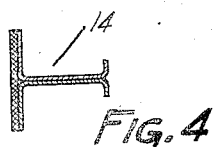
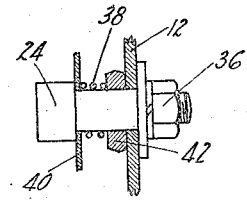
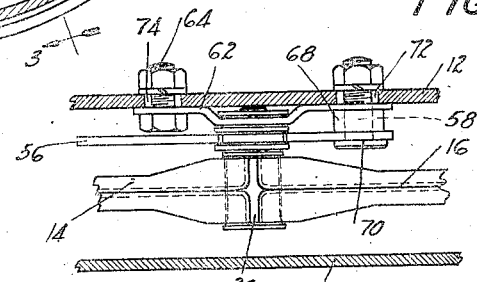
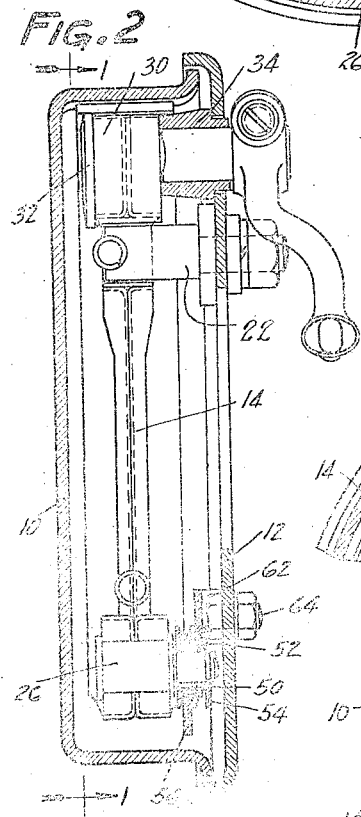
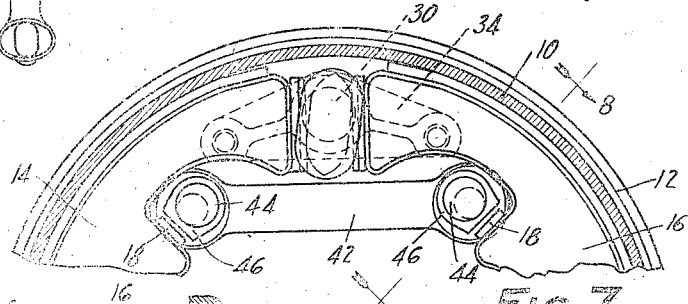
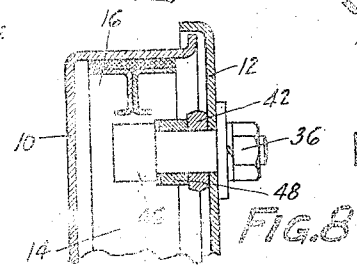
INVENTOR
LUDGER E. LA BRIE
BY
ATTORNEY Patented May 6, 1930

1,756,982

UNITED STATES PATENT OFFICE

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS

BRAKE

Application filed November 29, 1926. Serial No. 151,375.

This invention relates to brakes and is illustrated as embodied in an internal expanding brake of the type in which there is a friction device anchoring at one end when the drum is turning in one direction and at the other end when the drum is turning in the other direction, thus being fully effective in either direction of rotation of the drum. An object of the invention is to provide novel means for positioning the friction device when the drum is released, to insure accurate clearance between the friction device and the brake drum when the brake is not being used.

In one desirable arrangement there is a positioning part carried by the friction device and which is illustrated as a pivot connecting the shoes, and which is urged against a novel stop arranged on the side next the center of the drum, by a spring or the like which I prefer to connect to a wedge or lever engaging the opposite side of the pivot. Various features of novelty relate to the mounting of the stop and the lever, especially in arranging them to permit of adjustment.

Other objects of the invention, including a novel construction of the brake anchor, and other desirable and novel details of construction, will be apparent from the following description of the illustrative embodiments shown in the accompanying drawing, in which:

Figure 1 is a vertical section through the brake just inside the head of the brake drum and showing the brake shoes in side elevation;

Figure 2 is a vertical section diametrically through Figure 1 and showing the brake-operating means and the novel positioning means for the shoes or their equivalents;

Figure 3 is a partial radial section on the line 3—3 of Figure 1 and showing the mounting of the stop and lever at one end;

Figure 4 is a section through one of the brake shoes on the line 4—4 of Figure 1;

Figure 5 is a partial section on the line 5—5 of Figure 1 through one of the anchors of the brake;

Figure 6 is a partial section on the line 6—6 of Figure 1 and showing the above-described pivot and positioning means;

Figure 7 is a view corresponding to the upper part of Figure 1 and showing a modified anchor arrangement; and Figure 8 is a partial radial section on the line 8—8 of Figure 7 through one of the anchors.

In the arrangement selected for illustration, the brake includes a rotatably mounted drum 10 at the open side of which there may be arranged a backing plate or other support 12, and within which are arranged a pair of interchangeable brake shoes 14 and 16. The shoes are notched out adjacent their upper ends and provided with wear plates 18 urged by a return spring 20 against a pair of adjustable eccentric anchors 22 and 24. The shoes 14 and 16 may be connected to form an articulated friction device by a pivot pin 26 engaged by rounded notches formed in the ends of the shoes and forming a positioning part projecting from the shoes toward a backing plate 12, the two shoes being held in engagement with pivot 26 by a tensioned spring 28. The brake may be applied by means such as a double cam 30 shown with an end flange 32 confining the ends of the shoes laterally and supported by a suitable bracket 34 which is mounted on the backing plate 12 in any desired manner permitting it to shift with the cam substantially along a chord of the drum. When the drum is turning in a counter-clockwise direction when the brake is applied, as shown in Figure 1, the shoe 16 anchors against the anchor 24, being forced against the drum by a servo action from the shoe 14. Conversely, when the drum is turning in a clockwise direction at the time the brake is applied, shoe 14 anchors against the anchor 22.

As shown in Figure 5, the anchor pin 24 (or 22) may project through the backing plate 12 to receive a clamping nut 36 compressing a spacing member such as a coil spring 38 between a washer 40 and a reinforcing bar 42 which connects the anchors 22 and 24. As shown in Figures 7 and 8, instead of having the eccentric anchor formed integrally on the pin 24, the pin may be provided at its end with an eccentric 44 on which is sleeved a separate part 46 flattened on one side to form a thrust surface for the wear plate 18. In this arrangement I have also substituted a solid spacer 48 for the coil spring 38.

An important feature of novelty of the present invention relates to means acting on the inwardly projecting part of pivot 26 to center the pivot and position it radially of the drum when the brake is released. I prefer to mount on a reduced portion at the end of the lever a pair of rollers 50 and 52 flanged on the sides opposite the backing plate and cooperating with a washer 54 riveted on the end of the pivot 26 to form two grooves. In one of these grooves, with its edge in engagement with the lower surface of the roller 50, there is arranged a device such as a thin and relatively broad lever 56. This lever is fulcrumed on a pivot 58 at one end and is connected to its opposite end to one end of a tension spring 60 which is connected at its upper end to the backing plate 12. The lever 56 has a notch approximately at its center which embraces the roller 50 and which forms, in effect, a pair of opposed wedge surfaces embracing the roller. It will be seen that the shifting of the shoes 14 and 16 in either direction when the brake is applied, will move pivot 26 to rock the lever 56 downwardly to increase the tension of the spring 60 so that when the brake is released the spring 60 will cause the lever 56 to have a wedging action on the pin 26 to return the pin to a centered position. The upper side of the roller 42 is engaged by the lower edge of a novel stop or positioning bar 62, which is thin and relatively broad and which is preferably held at one end by the bolt 58 and at the other end by a separate bolt 64. As shown in Figures 3 and 6, the bolt 58 has at its inner end a collar 66 upon which the lever 56 is pivoted, and which serves as a head engaging the side of a spacer 68 which is integral with or preferably merely is a separate part engaging the positioning bar 62 and clamping it against the backing plate 12. The pivot or bolt 58 is provided with an end flange 70 to hold the lever 56 in position axially of the pivot.

It will be seen by comparison of Figures 3 and 6 that the bolt 58 passes through a slot 72 extending in the direction of a horizontal chord of a brake drum, so that the positioning bar 62 may be shifted lengthwise to adjust it by loosening the nut on the end of the bolt 58 and making the desired adjustment and then tightening the nut again. The bolt 64 passes through a relatively large opening 74 in the backing plate 12 so that by loosening the nut on the bolt 64 the positioning bar 62 may be adjusted angularly about the bolt 58 as a center.

As best shown in Figure 1, the positioning bar 62 is formed at its center with a rounded projecting portion which engages the roller 52 and on opposite sides of which the positioning bar is cut away so that the roller 52 is not in engagement with an edge of the bar when the brake is applied.

The adjustment of the bar 62 as described above is for the purpose of determining the position of the pivot 26 radially of the brake drum. This position should be as far from the center of the drum as possible while yet giving sufficient clearance between the drum and the friction material carried by the shoes 14 and 16 when the brake is released. In order to make the adjustment, the brake is applied by turning cam 30 when the drum 10 is not rotating so that the shoes 14 and 16 will engage the drum but will not move the pivot 26 to either side of the vertical diameter of the drum. While the shoes are held in this position, the positioning bar 62 is moved lengthwise to bring the rounded projection at its center into a position where it engages the top of the roller 52, and then the left-hand end of the positioning bar 62 is moved outwardly as far as possible, whereupon the two bolts 58 and 64 are tightened to preserve the adjustment.

When, now, the brake is released again the desired minimum clearance will be secured at the lower ends of the friction portions of the two shoes. When the brake is again in service after such an adjustment, the lever 58 not only serves to center the shoes but also serves to urge the pivot 26 toward the positioning bar 62 to determine its radial position when the brake is released.

While two illustrative embodiments have been described in detail, it is not my intention to limit the scope of the invention to those particular embodiments or otherwise than by the terms of the appended claims.

I claim:

1. A brake comprising, in combination, a drum, a friction device engageable with the drum and anchoring at one end when the drum is turning in one direction and at the other end when the drum is turning in the other direction and having a positioning part midway between said ends, a positioning bar inside said part and having a projecting portion engageable with the positioning part and which is cut away on opposite sides of said portion, and means yieldingly urging said part radially inward against the projecting portion of the bar.

2. A brake comprising, in combination, a drum, a friction device engageable with the drum and having a positioning part midway between its ends, a positioning bar inside said part and having a projecting portion engageable with the positioning part and which is cut away on opposite sides of said portion, and means yieldingly urging said part radially inward against the projecting portion of the bar.

3. A brake comprising, in combination, a drum, a friction device engageable with the drum and having a positioning part midway between its ends, a positioning bar extending substantially along a chord of the drum just inside said part, and means yieldingly urging said part radially inward against the bar, the ends of said bar being normally fixed but being adjustable.

4. A brake comprising, in combination, a drum, a friction device engageable with the drum and having a positioning part midway between its ends, a positioning bar extending substantially along a chord of the drum just inside said part, and means yieldingly urging said part radially inward against the bar, the ends of said bar being normally fixed but being independently adjustable.

5. A brake comprising, in combination, a drum, a friction device engageable with the drum and having a positioning part midway between its ends, a positioning bar extendng substantially along a chord of the drum just inside said part, and means yieldingly urging said part radially inward against the bar, the bar being adjustable lengthwise and also being adjustable angularly about one end.

6. A brake comprising, in combination, a drum, a friction device engageable with the drum and having a positioning part midway between its ends, a positioning bar extending substantially along a chord of the drum just inside said part, and means yieldingly urging said part radially inward against the bar, said means wedgingly engaging said part and including a spring urging said part against the bar and tensioned by the wedging of said means as the part shifts when the brake is applied and which urges the friction device toward a centered position when the brake is released.

7. A brake comprising, in combination, a drum, a friction device engageable with the drum and having a positioning part midway between its ends, a positioning bar extending substantially along a chord of the drum just inside said part, and with a lever acting on said part and a spring urging said part against the bar and tensioned by movement of the lever as the part shifts when the brake is applied and which acts on the lever to urge the friction device toward a centered position when the brake is released.

8. A brake comprising, in combination, a drum, a friction device engageable with the drum and having a positioning part midway between its ends, a positioning bar extending substantially along a chord of the drum just inside said part, a lever having opposed wedge surfaces engaging said part on the side opposite the bar, and a spring tensioned to urge the lever against said part.

9. A brake comprising, in combination, a drum, a friction device engageable with the drum and having a positioning part midway between its ends, a positioning bar extending substantially along a chord of the drum just inside said part, a lever pivoted at one end and having opposed wedge surfaces engaging said part on the side opposite the bar, and a spring connected to the other end of the lever and tensioned to urge the lever against said part.

10. Positioning means for the friction device of a brake comprising, in combination with the friction device and the brake drum, a positioning part carried by the friction device, a fixed stop engaging said part on the side next the center of the drum, and a yieldingly-operated wedge acting on said part and urging it against the stop.

11. Positioning means for the friction device of a brake comprising, in combination with the friction device and the brake drum, a positioning part carried by the friction device, a fixed stop engaging said part on the side next the center of the drum, and a yieldingly-operated lever acting on said part and urging it against the stop.

12. Positioning means for the friction device of a brake comprising, in combination with the friction device and the brake drum, a positioning part carried by the friction device, a fixed stop engaging said part on the side next the center of the drum, a lever having opposed wedge surfaces engaging said part on the side opposite the center of the drum, and a spring urging the lever against said part.

13. Positioning means for the friction device of a brake comprising, in combination with the friction device and the brake drum, a postioning part carried by the friction device, a fixed stop engaging said part on the side next the center of the drum, a lever pivoted at one end and having opposed wedge surfaces engaging said part on the side opposite the center of the drum, and a spring connected to the other end of the lever and urging the lever against said part.

14. Positioning means for the friction device of a brake comprising, in combination with the friction device and the brake drum, a positioning part carried by the friction device, a fixed stop engaging said part on the side next the center of the drum, and a yieldingly-operated wedge acting on said part and urging it against the stop, said friction device consisting of a pair of arcuate shoes arranged end to end and said part constituting a pivot between the adjacent ends of the shoes.

15. Positioning means for the friction device of a brake comprising, in combination with the friction device and the brake drum, a positioning part carried by the friction device, a fixed stop engaging said part on the side next the center of the drum, and a yieldingly-operated lever acting on said part and urging it against the stop, said friction device consisting of a pair of arcuate shoes arranged end to end and said part constituting a pivot between the adjacent ends of the shoes.

16. Positioning means for a floating pivot connecting adjacent ends of a pair of brake shoes, comprising, in combination with said pivot, a fixed bar on one side of the pivot and serving as a stop for the pivot, a lever engaging the opposite side of the pivot, a fastening for one end of said bar arranged to serve as a fulcrum for the lever, and a spring acting on the lever at the end opposite said fulcrum and acting through the lever to urge said pivot toward the fixed bar.

17. A stop device for a floating part of the friction means of a brake, comprising, in combination, an elongated bar having a portion engageable with said part and cut away on opposite sides of said portion, a fastening for one end of the bar permitting the bar to be adjusted in the direction of its length, and a fastening for the other end of the bar permitting angular adjustment of the bar about the first fastening as a center.

18. A stop device for a floating part of the friction means of a brake, comprising, in combination, an elongated bar engageable with said part, a fastening for one end of the bar, and a fastening for the other end of the bar permitting angular adjustment of the bar about the first fastening as a center.

19. A stop device for a floating part of the friction means of a brake, comprising, in combination, an elongated bar having a portion engageable with said part and cut away on opposite sides of said portion, and fastenings for the two ends of the bar.

20. A stop arranged to serve as the anchor of a brake and comprising, in combination, an anchor pin having an eccentric stop part at its end, a stationary support through which the pin passes, a spacing spring sleeved on the pin between said stop part and the support, and a nut threaded on the end of the pin and tightened against said support opposite the spacing spring.

21. Positioning means for the friction means of a brake, comprising, in combination, a stationary support, a stop member adjacent the support, a fastening having an enlarged collar engaging the stop member opposite the support and passing through the stop member and the support and securing the stop member to the support, and a lever having an opening sleeved on the enlarged collar and freely movable angularly thereon.

22. Brake-positioning means comprising, in combination, a floating member having a pair of rollers arranged side by side, a stationary stop bar on one side of said member and engaged by one of said rollers, and a part on the other side of said member urged yieldingly against the other of said rollers.

23. Brake-positioning means comprising, in combination, a floating pivot member having at its end a pair of very narrow rollers arranged side by side, a relatively thin and broad part on the other side of said member with its edge urged yieldingly against the other of said rollers.

24. Brake-positioning means comprising, in combination, a floating pivot member having at its end a pair of very narrow rollers arranged side by side, a relatively thin and broad part on the other side of said member with its edge urged yieldingly against the other of said rollers, the rollers having flanges on their sides opposite the end of the pivot member and the pivot member having a washer at its extreme end, the flanges and washer defining two grooves for said stop bar and said part.

25. A brake comprising, in combination, a drum, a friction device engageable with the drum and anchoring at one end when the drum is turning in one direction and at the other end when the drum is turning in the other direction and having a positioning part midway between said ends, an anchor member supported adjacent to each end which is adjustable with respect to the drum, and a positioning stop supported adjacent to the positioning part of the friction device to be engaged thereby and which also is adjustable with respect to the drum.

In testimony whereof, I have hereunto signed my name.

LUDGER E. LA BRIE.